United States Patent [19]

Watanabe

[11] 4,427,865
[45] Jan. 24, 1984

[54] METHOD OF HEAT-BONDING INTERIOR MATERIAL

[75] Inventor: Hiroo Watanabe, Miura, Japan

[73] Assignee: Nissan Motor Company, Limited, Yokohama, Japan

[21] Appl. No.: 299,140

[22] Filed: Sep. 3, 1981

[30] Foreign Application Priority Data

Nov. 21, 1980 [JP] Japan .................................. 55-163210

[51] Int. Cl.³ ............................................. H05B 6/54
[52] U.S. Cl. .............................. 219/10.41; 219/10.53; 219/10.81; 219/10.73; 156/274.4; 156/275.1; 156/380.8
[58] Field of Search ............... 219/10.53, 10.81, 10.73, 219/10.41, 10.43, 10.47; 156/273.7, 274.4, 275.1, 379.9, 380.4, 380.6, 380.8, 583.1, 583.7, 583.9, 220; 5/481; 264/257, 258, 319

[56] References Cited

U.S. PATENT DOCUMENTS

| | | | |
|---|---|---|---|
| 2,747,646 | 5/1956 | Lippman | 219/10.81 X |
| 2,850,609 | 9/1958 | Siegel | 219/10.53 X |
| 3,010,157 | 11/1961 | Cizek | 219/10.53 X |
| 3,060,513 | 10/1962 | Klink et al. | 156/274.4 X |
| 3,781,978 | 1/1974 | Intrator et al. | 219/10.53 X |
| 3,833,439 | 9/1974 | Smith | 156/273.7 X |
| 4,313,776 | 2/1982 | Urai et al. | 156/273.7 X |

Primary Examiner—Volodymyr Y. Mayewsky
Assistant Examiner—Philip H. Leung
Attorney, Agent, or Firm—Schwartz, Jeffery, Schwaab, Mack, Blumenthal & Koch

[57] ABSTRACT

A method for heat-bonding interior material including heating one electrode of a high-frequency welder to about 100° C. less than the melting point of the outermost interior finishing material. The increased temperature raises the susceptibility of the cushioning material to dielectric heating from a high-frequency oscillating voltage from the high-frequency welder. There is also disclosed a method for selecting a urethane foam as a cushioning material which is optimal for use with the disclosed heat-bonding method, by determining the specific gravity and the air permeability rate of the urethane foam.

3 Claims, 8 Drawing Figures (a)

(b)

(c)

METHOD OF HEAT-BONDING INTERIOR MATERIAL

BACKGROUND OF THE INVENTION

1. Field of the Invention

The present invention relates to a high-frequency heat-bonding method for layers of material used to finish automotive vehicle interiors, including seat cushions. The invention relates more specifically to a method of heat-bonding foam resin material to outer finishing layers without using adhesives or chemical heat-bonding agents. Even more specifically, there is disclosed a method for selecting a urethane foam most suitable for use in the method of the present invention.

2. Description of the Prior Art

In order to finish automotive vehicle interiors, generally, an interior finishing material such as nylon cloth, a cushioning material such as foamed urethane, and a lining material such as nylon cloth, cotton cloth (calico), or non-woven material are piled up in order and heat-bonded to each other at the desired positions. In some cases, however, only a finishing material and foamed resin material are heat-bonded, omitting the lining material.

Conventionally, in the case where the interior finishing material, a foamed resin material and a lining material are heat-bonded together at the necessary positions, a high-frequency welder has been used to heat these three materials.

In the prior-art heat bonding method, however, since the melting temperature of the foamed resin material is higher than that of the interior finishing material, it is difficult to melt only the foamed material without melting the interior finishing material. Further, when these two materials are heat-bonded without melting the finishing material, it is difficult to heat-bond the layers firmly.

To overcome this problem, it has been necessary to apply an appropriate heat-bonding agent or adhesive agent, in advance, onto one or both sides of the foamed resin material locally, or to impregnate a powder heat-bonding agent thereinto or liquid adhesive agent thereon for bonding the layers of these materials together.

In practice, during the above-mentioned method where a heat-bonding agent or an adhesive agent is applied to the foamed resin cushion before heating, it is difficult to apply or impregnate the heat-bonding agent or the adhesive agent correctly to the desired positions. In addition, the extra manufacturing processes involved results in an increase in manufacturing cost.

SUMMARY OF THE INVENTION

It is therefore a primary object of the present invention to provide a method of heat-bonding layers of material used to finish automotive vehicle interiors, without using any adhesives or chemical heat-bonding agents.

To achieve the above-mentioned object, the method of heat-bonding an interior finishing material and a foamed resin material together firmly comprises the processes of heating the electrodes used for high frequency induction heating to a given previously determined temperature and selecting the specific gravity and the air permeability rate of the foamed resin material in advance.

The layers of material pertaining to the present invention include an inner material incorporating a cushioning material, such as foam resins, and an interior finishing material. A high-frequency welder comprises a stationary electrode platen, a movable electrode, means for heating the movable electrode, and a high-frequency AC generator connected between the electrodes for applying high-frequency alternating current thereto. The movable electrode is heated so as to favorably affect the dielectric induction heating characteristics of the cushioning material. When suitably hot, the electrode is lowered so as to pinch the materials to be bonded against the electrode platen, thereby applying the heat of the electrode to the materials. Simultaneously the generator operates to create a high-frequency oscillating voltage across the electrodes with the materials acting as a composite dielectric.

The pre-heating due to the movable electrode affects the dielectric heating characteristics of the different materials to different degrees in such a manner that dielectric heating is increased in the materials with higher melting points. In this manner, the materials can all be brought to near melting without danger of causing melting damage to any of the materials. Thus, strong bonding can be achieved without adversely effecting the appearance of the interior finishing material.

There are also disclosed criteria for the selection of foam resin, especially urethane foam, suitable for use with the method of the present invention. The presence of large foam cells adversely effects bond strength. Since cell size is inversely proportional to foam density, foam resins of sufficient specific gravity will be nearly free of large cells. Cell size uniformity also implies a lack of large cells. For low-specific-gravity foam resins, air permeability rate is a good indicator of cell size uniformity. Appropriate ranges of specific gravity and/or air permeability are disclosed for urethane foam.

BRIEF DESCRIPTION OF THE DRAWINGS

The application and advantages of the invention will be easily discerned by reference to the detailed description of the preferred embodiment and the following drawings, wherein:

FIG. 3(*b*) is an enlarged perspective view of the wrinkled area labeled 'b' in FIG. 3(*a*);

FIG. 3(*c*) shows the area of FIG. 3(*b*) after application of the wrinkle-reduction method depicted in FIG. 3(*a*);

DETAILED DESCRIPTION OF THE PREFERRED EMBODIMENTS

To facilitate understanding of the present invention, a brief reference will be made to a prior-art method of heat-bonding layers of automotive vehicle interior materials, with reference to the attached drawings.

The material used to cover automobile interior surfaces and seats generally includes an interior finishing material, such as nylon cloth, polyamide resins, and many others, underlaid with a cushioning material, such as urethane foam resins, and a lining material such as nylon or cotton cloth (calico) or a non-woven material. In some cases, the lining material is omitted. Frequently, these layers are heat-bonded together at specified positions to form seams, pleats, tucks, recesses, and the like. This heat bonding is performed by a high-frequency welder as shown in FIG. 1 which comprises a stationary electrode platen 16, a vertically-movable electrode 14, and a high-frequency AC generator 18 connected between the two electrodes for providing high-frequency alternating current thereto on demand.

Figure 2:
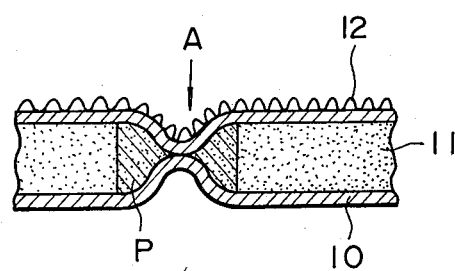
FIG. 2 is a cross-sectional view of interior material including a heat bond produced by the method of FIG. 1.

A layer of interior finishing material 12, cushioning material 11, and lining material 10 are vertically ordered and horizontal aligned as desired on the electrode platen 16. The movable electrode 14 is then lowered toward the stationary electrode platen 16 so as to pinch the layers of material 10-12 together between the electrodes 14 and 16. The high-frequency AC generator 18 then operates to generate a high-frequency oscillating voltage across the electrodes 14 and 16 with the layers of material 10-12 acting as a composite dielectric. Brief application of the high-frequency oscillating voltage raises the temperatures of the material layers 10-12 to near melting due to dielectric induction heating. Due to the pinching pressure, the softened material layers 10-12 partially coalesce at the spot A (in FIG. 2) between the electrodes 14 and 16. The electrode 14 is then removed from the spot A, and the material layers cool and harden to form a bonding site at the spot A, as shown in FIG. 2.

The strength of the heat bond depends critically on how close to melting material layers come before solidifying to form the bonding site. However, since the melting temperature of the foam resin material (about 250° C.) tends to be higher than that of the interior-finishing material (about 220° C.), it is difficult to achieve strong bonding without melting the finishing material.

Figure 1:
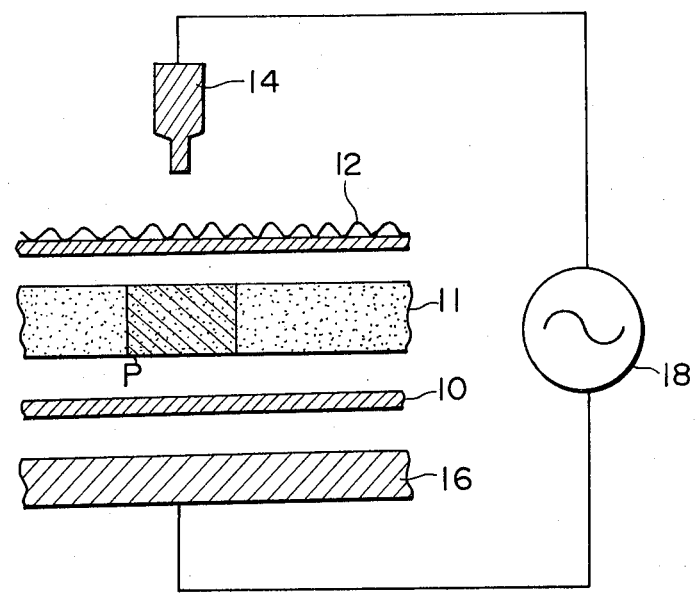
FIG. 1 is a diagram of a prior-art heat-bonding operation.

Therefore, the heat-bonding may include impregnating a heat-bonding agent with a melting point of about 150° C. into a given part of the foamed urethane cushioning material 11 as shown in FIG. 1 by the hatched area P. In this method, after the above treatment has been completed, pressure is applied to the three layers of interior finishing material 12, foamed urethane cushioning material 11 and lining material 10 by the movable electrode 14 and then a high frequency voltage is applied thereto by the high frequency welder 18, so that the desired position A is heat-bonded, as depicted in FIG. 2.

Figure 3:
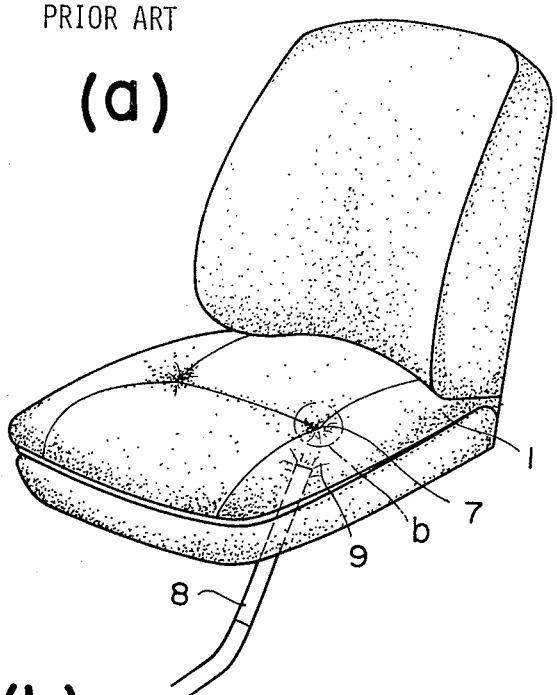
FIG. 3(*a*) is a perspective view of an automotive seat depicting a prior-art wrinkle-reduction method.
Figure 3:
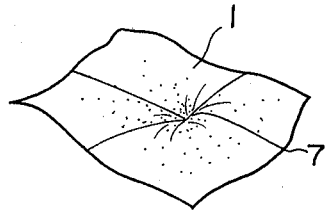
Figure 3:
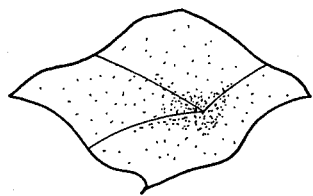

After heat-bonding, wrinkles 7 may appear on uneven portions of the finishing material. To remove these wrinkles 7, it is steam at a vapor pressure of 4–6 Kg/cm² and vapor temperature of 140°–160° C. may be blown against the seat cover by inserting a blowing nozzle 8 under the seat cover as shown in FIG. 3(c).

Figure 4:
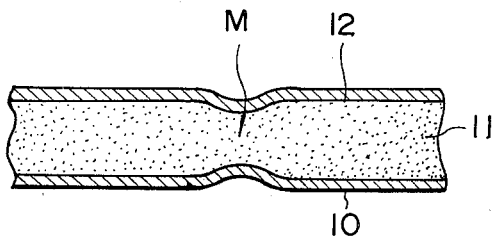
FIG. 4 is a cross-sectional view of a bonding site which has failed due to application of the wrinkle-reduction method of FIG. 3(*a*)

In this wrinkle-reduction process, however, since the temperature of the applied steam is comparable to the melting point of the heat-bonding or adhesive agent, seat covers previously heat-bonded are susceptible to deformation and therefore the complete failure of the bond can occur as shown in FIG. 4. This may be due to the fact that since the sizes of the cells within the foamed resin material are not uniform, there may be some places where it is impossible to heat-bond the materials together firmly by using high frequency induction heating.

In general, the greater the specific gravity of the foamed resin material, the more uniform the size of the foamed cells will be and the smaller the specific gravity of the resin material, the less uniform the size of the foamed cells. While it is desirable to use a foamed resin material of a high specific gravity for stabilization of the heat-bonding, the greater the specific gravity, the higher the cost. It is therefore desirable to use a foamed resin material having a smaller specific gravity, and therefore lower cost for mass-producing foamed resin cushions.

One well-known way of dealing with this problem is to apply adhesives or chemical heat-bonding agents to the foam resin at the bonding site, as shown in FIGS. 1 and 2 by the cross-hatched area P. This provides a strong bond, but incurs added costs in materials and application of labor.

Figure 5:
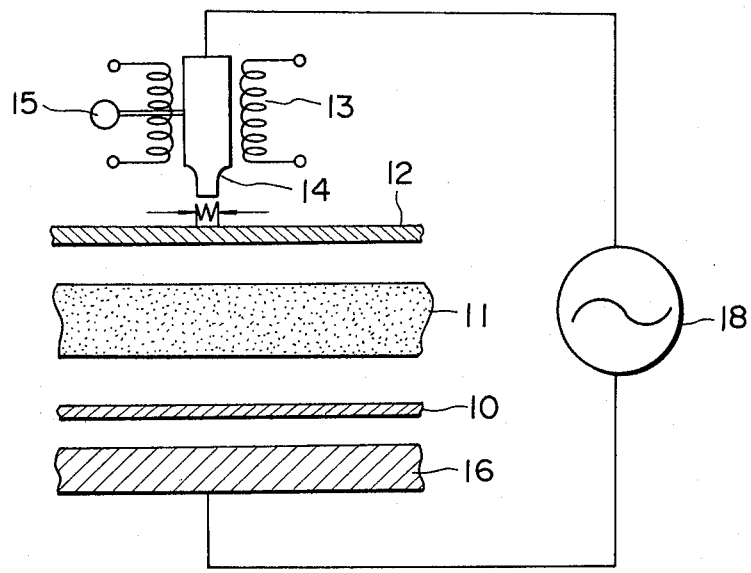
FIG. 5 is a diagram of a preferred embodiment of the method of the present invention.
Figure 6:
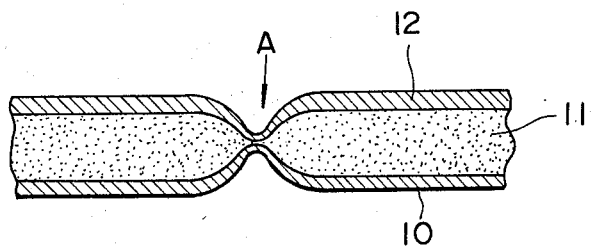
FIG. 6 is a cross-sectional view of a bonding site as produced by the method of the present invention.

Reference is now made to FIGS. 5 and 6, and more specifically to FIG. 5, to explain a method of heat-bonding the interior finishing material and foamed resin material according to the present invention.

In these figures, reference numeral 10 denotes a lining material, numeral 11 denotes a foamed urethane cushioning material, the specific gravity and the air permeability rate of which are pre-selected. In this embodiment, nylon is used for the lining material, and urethane with a specific gravity of 0.021 and an air permeability rate of 80–250 cc/cm².sec (for a thickness of 1 cm) is used for the foamed finishing material.

Reference numeral 12 denotes the interior finishing material. In this embodiment, it is possible to use various materials such as stockinette, vinyl leather, etc., without limiting the interior finishing material to polyamide resin, since no heat-bonding agent or adhesive agent liable to produce stains or spots on the finishing material is necessary for heat-bonding it to the formed urethane cushioning material 11. In that regard, the present method is different from the prior-art method. Further, with the present invention, it is also possible to use urethane onto which cloth woven from nylon yarn is bonded. That is to say, according to the present invention, it is possible to use various kinds of interior finishing materials in accordance to the use desired, this represents an additional improvement over the conventional methods.

In FIG. 5, reference numeral 16 denotes a stationary electrode platen, numeral 14 denotes a movable electrode disposed against the electrode plate 16, and numeral 18 denotes a high frequency AC generator.

For the electrode 14, a heating means such as an electric heater 13 is provided. Additionally, a temperature sensor 15 is disposed in a position so as to maintain the electrode temperature constant at, for instance, 100° C. lower than the melting point of the interior finishing material 12 when the interior finishing material and foamed resin material are heat-bonded together.

The shape of the movable electrode 14 is selectable according to the use, for example, for a seat, door, etc. In this embodiment, a 2 mm-wide, 600 mm-long (perpendicular to the paper in FIG. 5) electrode is used.

In the system of the preferred embodiment of the invention shown in FIG. 5, a layer of cushioning material 11, such as urethane foam, is sandwiched between layers of lining material 10, such as nylon cloth, and interior finishing material 12, such as decorative nylon cloth or non-woven polyamide resin. The arranged layers rest on a stationary electrode platen 16 of a high-frequency welder 18. The other movable electrode 14 of the high-frequency welder 18 is provided with heating devices 13, such as resistive heating coils. The heating devices 13 serve to heat the electrode 14, preferably to a temperature of the order of 100° C. below the melting temperature of the interior finishing material 12.

When the electrode 14 is adequately heated, it is lowered toward the electrode platen 16 so as to apply a pinching pressure to the layers of material 10–12 at the desired bonding site A as shown in FIG. 6. At that time, the high-frequency welder 18 generates a high-frequency oscillating voltage between the movable electrode 14 and the stationary electrode platen 16 with the material layers 10–12 acting as a composite dielectric.

Dielectric induction heating due to the oscillating electric field and direct heating from the heated electrode 14 cause a momentary increase in plasticity of the material layers (10–12) so that they partially coalesce under the influence of the pinching pressure. When the layers 10–12 cool after removal of the electrodes 14, 16, they remain partially united at the pinched portion A to form a bonding site.

In this embodiment, since the movable electrode 14 is separated from the interior finishing material 12 immediately after the heat-bonding has been completed, it is possible to obtain strong heat bonding at any desired position as shown by the symbol A in FIG. 6 without damage to the interior finishing material 12 and the lining material 10 due to overheating.

The reason why a good heat-bonding result can be obtained without the prior application of an adhesive agent onto or impregnating a heat-bonding agent into the foamed urethane cushioning material is explained as follows:

Generally, the heat P (in W/cm$^3$) generated in a dielectric material by dielectric heating can be expressed as follows:

$$P = \frac{5}{9} \times f \times \epsilon \times E^2 \times \tan \delta \times 10^{-12}$$

where
- f: oscillation frequency
- $\epsilon$: dielectric constant
- E: electric field intensity
- tan $\delta$: dielectric power factor In the above expression, it is possible to increase the strength of heat bonding by increasing the heat P. Although it is desirable to increase the electric power applied to the materials by increasing the electric field intensity E, when the power becomes excessively large, there is a problem in that a spark is easily generated. At present, three oscillation frequencies f of 13.56 MHz, 27.12 MHz and 40.68 MHz are used for the industrial use.

In the above expression, the dielectric constant $\epsilon$ is roughly the same in each material, and the dielectric power factor tan $\delta$ changes according to each material and material temperature. In accordance with the present invention, since the movable electrode 14 is preheated to about 80°–120° C. below the melting point of the finishing material by the electric heater 13 so as to heat the foamed urethane cushioning material 11 partially by transmitting heat directly to the foamed urethane cushioning material 11 through the interior finishing material 12 when a pressure applied thereto, it is possible to increase the dielectric power factor, that is, to increase the internal heat generated.

Although the interior finishing material 12 is also heated as a result of contact with the movable electrode 14, the interior finishing material does not melt. This is because the increase in the dielectric power factor of the interior finishing material 12 due to heating is smaller than that of the dielectric power factor of the foamed urethane cushioning material 11 due to heating.

According to experiments, it is possible to obtain good results, without special attention to the air permeability rate, when the specific gravity of the foamed urethane cushion is above 0.022. With the present invention, however, good results from the standpoint of economic considerations has been obtained by using a foamed urethane of specific gravity of 0.021 or less or by using a foamed urethane with an air permeability rate of 80–250 cc/cm$^2$ sec with a thickness of 1 cm when the specific gravity thereof is 0.021.

In this regard, the present method of heat-bonding the interior finishing material to the foamed urethane has achieved good results with an oscillation frequency of 40.68 MHz, and an electrode plate 4 of 1000–1500 mm in length and 800–1000 mm in breadth.

Since, according to the present invention, it is unnecessary to apply an adhesive agent onto or impregnate a heat-bonding agent into the foamed resin material, it is possible to prevent the heat-bonded positions from separating from each other even when high-temperature, high-pressure steam is blown against the interior finishing material to remove wrinkles, especially when the material is used for the seat cover of vehicle seats. In addition, the present method reduces the number of manufacturing processes and the manufacturing costs markedly.

Furthermore, with the present method, various kinds of interior finishing materials are usable because no heat-bonding agent or adhesive agent is applied thereto. It is therefore possible to select a desirable material from among various interior finishing materials taking into consideration the appearance and feel of the material.

The method of the present invention can be seen to provide several advantages. Avoiding the use of chemical adhesives or heat-bonding agents saves time and money in manufacturing and allows for selection of cushioning and interior finishing materials from a wider range of possibilities. The invention also provides for the use of low-specific-gravity urethane foam as a cushioning material, which also reduces material costs. These advantages are in addition to the basic advantage of providing a strong and reliable bond.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A method of heat-bonding interior finishing material to foamed resin cushioning material with a high-frequency welder including a stationary electrode, a movable electrode, a high-frequency AC generator, and an electric heater associated with the movable electrode, which comprises the following steps of:
    (a) pre-selecting a urethane foamed resin cushioning material having foam of nearly uniform cell size with a specific gravity of less than about 0.021 and an air permeability rate in the range of from about 80 to 250 cc/cm$^2$.sec with a thickness on the order of 1 cm;

(b) arranging a layer of the interior finishing material and a layer of the pre-selected foamed resin cushioning material to be bonded;

(c) heating the movable electrode of the high-frequency welder by the electric heater to a temperature below a melting point of the outermost layer of the interior finishing material;

(d) pinching the arranged layers to be bonded between the heated movable electrode and the stationary electrode; and (e) applying a high-frequency oscillating voltage to the movable and stationary electrodes from the high-frequency AC generator, whereby a uniform heat-bond force, capable of withstanding the effects of high-temperature, high-pressure steam is obtained.

2. A method of heat-bonding as set forth in claim 1, wherein a layer of lining material is further arranged under the layer of urethane foamed resin cushioning material.

3. A method of heat-bonding as set forth in claim 1, wherein the step of heating further includes the step of heating the movable electrode to a temperature of about 80°–120° C. below the melting point of the finishing material.

* * * * *